United States Patent
De et al.

(10) Patent No.: US 10,108,377 B2
(45) Date of Patent: Oct. 23, 2018

(54) STORAGE PROCESSING UNIT ARRAYS AND METHODS OF USE

(71) Applicant: Western Digital Technologies, Inc., Irvine, CA (US)

(72) Inventors: Arup De, Milpitas, CA (US); Kiran Kumar Gunnam, Milpitas, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 99 days.

(21) Appl. No.: 14/941,198

(22) Filed: Nov. 13, 2015

(65) Prior Publication Data

US 2017/0139606 A1    May 18, 2017

(51) Int. Cl.
| | | |
|---|---|---|
| G06F 13/14 | (2006.01) | |
| G06F 3/06 | (2006.01) | |
| G06F 13/40 | (2006.01) | |
| G06F 13/38 | (2006.01) | |
| G06F 13/16 | (2006.01) | |

(52) U.S. Cl.
CPC .......... *G06F 3/067* (2013.01); *G06F 3/061* (2013.01); *G06F 3/064* (2013.01); *G06F 3/0688* (2013.01); *G06F 13/1668* (2013.01); *G06F 13/385* (2013.01); *G06F 13/4059* (2013.01); *G06F 13/4068* (2013.01)

(58) Field of Classification Search
USPC .......... 710/104–110, 305–317; 709/238–244
See application file for complete search history.

(56) References Cited

U.S. PATENT DOCUMENTS

| | | | |
|---|---|---|---|
| 6,718,428 B2* | 4/2004 | Lee | ..................... H04L 67/1097 709/213 |
| 7,401,161 B2* | 7/2008 | Lee | ......................... H04L 12/56 709/240 |
| 7,475,174 B2 | 1/2009 | Chow et al. | |
| 7,486,619 B2* | 2/2009 | Chen | ................... H04L 49/1576 370/235 |
| 8,285,919 B2 | 10/2012 | Luo et al. | |
| 8,397,011 B2 | 3/2013 | Ashwood | |

(Continued)

FOREIGN PATENT DOCUMENTS

| | | |
|---|---|---|
| JP | 2004326799 A | 11/2004 |
| KR | 10-2014-0090928 A | 7/2014 |

OTHER PUBLICATIONS

Press Release "HLNAND SSD Achieves Unprecedented Per-channel Flash Performance," Aug. 2, 2010 <http://www.techpowerup.com/127798/hlnand-ssd-achieves-unprecedented-per-channel-flash-performance.html> (2 pages).

(Continued)

*Primary Examiner* — Raymond Phan
(74) *Attorney, Agent, or Firm* — Patterson & Sheridan, LLP; Steven Versteeg

(57) ABSTRACT

The embodiments disclosed herein include an interconnection network that is configured to provide data communication between storage processing units. The disclosed interconnection network can be particularly effective when the storage processing units are configured to locally perform scientific computations. The disclosed interconnection network can enable localized, high throughput, and low latency data communication between storage processing units without overloading the host system.

19 Claims, 18 Drawing Sheets

(56) References Cited

U.S. PATENT DOCUMENTS

| | | | |
|---|---|---|---|
| 8,677,068 | B2 | 3/2014 | Canepa et al. |
| 9,201,600 | B1 * | 12/2015 | Hayes .................. G06F 12/0246 |
| 9,258,191 | B2 * | 2/2016 | Harper ................... H04L 45/06 |
| 9,661,552 | B2 * | 5/2017 | Yogeeswaran ...... H04W 40/246 |
| 2003/0221018 | A1 | 11/2003 | Lee et al. |
| 2004/0236891 | A1 | 11/2004 | Arimilli et al. |
| 2010/0067278 | A1 | 3/2010 | Oh et al. |
| 2013/0275835 | A1 * | 10/2013 | Aswadhati .......... G06F 11/1068 714/773 |
| 2014/0047166 | A1 | 2/2014 | Asnaashari et al. |
| 2014/0136754 | A1 | 5/2014 | Hyde et al. |

OTHER PUBLICATIONS

Korean Office Action (with attached English translation of the Summary) for Application No. 10-2016-0151214; dated Jan. 5, 2018; 6 total pages.
Office Action issued in corresponding Japanese Patent Application No. 2016-221697, dated Feb. 20, 2018 (8 pages).

* cited by examiner

STORAGE PROCESSING UNIT ARRAYS AND METHODS OF USE

FIELD OF DISCLOSURE

The present disclosure relates to apparatus, systems, and methods for providing a storage processor array for scientific computations.

BACKGROUND

Solid state drives can include non-volatile solid-state memory, such as flash memory. Flash memory can include an improved form of Electrically-Erasable Programmable Read-Only Memory (EEPROM). Traditional EEPROM devices are only capable of erasing or writing one memory location (e.g., a memory cell) at a time. In contrast, flash memory allows multiple memory locations to be erased or written in one programming operation. Flash memory can thus operate at a higher speed compared to traditional EEPROM.

Solid-state memory has a number of advantages over other storage devices. For example, it generally offers faster read access times and better shock resistance than a hard disk drive (HDD). Unlike dynamic random access memory (DRAM), solid-state memory is generally non-volatile, meaning that data stored in flash memory is not lost when power to the memory is removed. These advantages, and others, may explain the increasing popularity of flash memory for storage applications in devices such as memory cards, USB flash drives, mobile phones, digital cameras, mass storage devices, MP3 players and the like.

SUMMARY

Embodiments of the present disclosure relate to apparatus, systems, and methods for providing a storage processor array for scientific computations.

Some embodiments of the present disclosure include a solid state device system. The solid state device system includes a plurality of storage processing units arranged as a two-dimensional array, wherein each of the plurality of storage processing units comprises a computational unit and a non-volatile memory module. The solid state device system also includes an interconnection network comprising a plurality of unit network modules, wherein the interconnection network is configured to provide data communication between the plurality of storage processing units. The plurality of storage processing units is grouped into a plurality of sub-arrays of storage processing units, and storage processing units in a first sub-array of the plurality of sub-arrays are coupled to one another using a first one of the plurality of unit network modules.

In some embodiments, storage processing units in a second sub-array of the plurality of sub-arrays are coupled to one another using a second one of the plurality of unit network modules.

In some embodiments, the plurality of sub-arrays, including the first sub-array and the second sub-array, are coupled to one another using a third one of the plurality of unit network modules, thereby forming a hierarchical interconnection of storage processing units.

In some embodiments, each of the unit network modules has a first type of interconnection topology.

In some embodiments, the first type of interconnection topology comprises a modified ring network topology.

In some embodiments, the first type of interconnection topology comprises a modified ring network topology.

In some embodiments, the first one of the plurality of unit network modules has a first type of interconnection topology and the second one of the plurality of unit network modules has a second type of interconnection topology.

In some embodiments, the first sub-array is disposed diagonally from the second sub-array, and the third one of the plurality of unit network modules comprises a diagonal interconnect that is configured to directly connect the first sub-array and the second sub-array.

In some embodiments, the diagonal interconnect is configured to directly connect a communication hub of the first sub-array and a communication hub of the second sub-array.

In some embodiments, the plurality of storage processing units is arranged on printed circuit board and the interconnection network comprises an electrical conductor on the printed circuit board.

In some embodiments, the solid state device system further includes a memory controller configured to schedule data transfer between the plurality of storage processing units via the interconnection network.

In some embodiments, the memory controller is further configured to load a plurality of blocks corresponding to a two-dimensional matrix onto the plurality of sub-arrays, trigger the plurality of sub-arrays to locally perform a transpose operation to compute a transpose of the plurality of blocks, and trigger two of the sub-arrays to exchange the transpose of blocks stored in the two of the sub-arrays via the interconnection network.

In some embodiments, the memory controller is configured to determine a route on the interconnection network over which the two of the sub-arrays exchange the transpose of blocks.

In some embodiments, the computational unit in the plurality of storage processing units is configured to perform scientific computation.

In some embodiments, one of the plurality of unit network modules comprises a L-diagonal type 1 unit network module.

In some embodiments one of the plurality of unit network modules comprises a L-diagonal type 2 unit network module.

In some embodiments one of the plurality of unit network modules comprises a L-diagonal type 3 unit network module.

In some embodiments one of the plurality of unit network modules comprises a L-diagonal type 4 unit network module.

In some embodiments one of the plurality of unit network modules comprises a full-mesh unit network module.

Some embodiments of the present disclosure include a system. The system can include a solid state device system in accordance with some embodiments, and a host device in data communication with the solid state device system, wherein the host device is configured to send data to the solid state device system to be processed by the computational unit in the plurality of storage processing units.

BRIEF DESCRIPTION OF THE FIGURES

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labeled in every figure. Nor is every component of each embodiment of the disclosed subject matter shown where illustration is not necessary to allow those of ordinary skill in the art to understand the disclosed subject matter.

FIGS. 14A-14C illustrates the block transpose operation of FIG. 13 for a particular input matrix.

DETAILED DESCRIPTION

Figure 1:
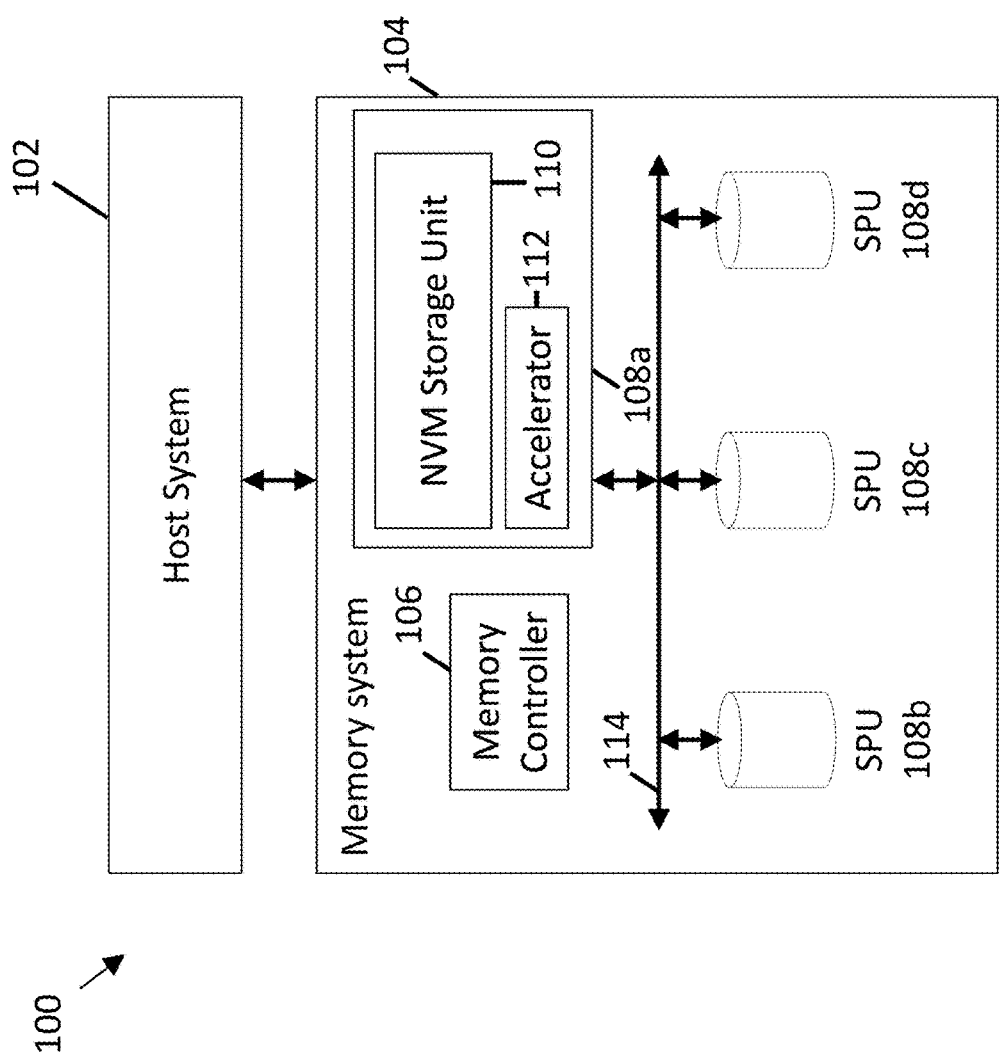
FIG. 1 illustrates an exemplary computing system having a host system and a storage system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

In a traditional compute and storage model, a computing system includes a host system and a storage system. In this model, the host system is designed to perform computations and the storage system is designed to store information to be processed by the host system. In some cases, the host system can coordinate the storage operation of the storage system, but the processing capabilities of the host system are often segregated from the storage system.

It is sometimes desirable to offload certain computational operations from the host system to the storage system. For example, in data-intensive applications, it may be desirable to augment the storage system with computation capabilities so that data intensive computations can be carried out locally in the storage system. This way, the host system can be relieved of computational requirements, and the input/output (I/O) requirements of the system as a whole can also be relieved.

Although the input/output (I/O) requirements of the system as a whole can be relieved, there can still be a significant need of data communication. Oftentimes, a storage system can include a plurality of storage processing units, and the storage processing units may need to communicate with one another in order to complete certain computations off-loaded from the host system. This communication could be performed either through the host-system or through the peer-to-peer communication bus, for example, the Peripheral Component Interconnect Express (PCIe) bus. Unfortunately, either approach quickly leads to saturation of the host system and/or the peer-to-peer communication bus. The data communication on a peer-to-peer communication bus is particularly impractical due to bandwidth constraints on the peer-to-peer communication bus.

Some embodiments of the present disclosure address the data communication between storage processing units in a storage system. In particular, disclosed embodiments include an interconnection network that is configured to provide data communication between storage processing units. The disclosed interconnection network can be particularly effective when the storage processing units are configured to locally perform scientific computations. The disclosed interconnection network can enable localized, high throughput, and low latency data communication between storage processing units without overloading the host system.

At a high level, the disclosed interconnection network allows storage processing units to communicate with one another without going through an intermediate device, such as a host system. Because the storage processing units can communicate with one another locally within the storage system, the communication between the storage processing units can be accomplished at high throughput and/or low latency.

In some embodiments, the disclosed interconnection network may connect storage processing units with a limited set of interconnections. For example, when a memory system includes four storage processing units arranged in a 2×2 matrix, the disclosed interconnection network may be arranged such that one of the storage processing units operates as a communication hub, thereby centralizing the communication between the storage processing units.

In some embodiments, the interconnection network can include a plurality of unit network modules. Each unit network module can be configured to interconnect a subset of storage processing units. In some cases, subsets of storage processing units can be coupled to each other in a hierarchical manner, thereby forming a hierarchical connection of unit network modules.

FIG. 1 illustrates an exemplary computing system having a host system and a storage system in accordance with some embodiments. The computing system 100 can include a host system 102 and a storage system 104, where the storage system 104 includes a memory controller 106, a plurality of storage processing units 108a-108d, and an interconnection network 114 between the plurality of storage processing units 108a-108d.

The host system 102 can include a computer system that uses and accesses a storage system 104 for data read and data write operations. Such a host system 102 may run applications such as databases, file systems, and web services. The host system 102 can include a host CPU, a host memory device, and a storage processing unit application programming interface (API), and/or a device driver. In some embodiments, the host system 102 can be physically co-located with (e.g., located physically close to) the storage system 104. In such embodiments, the host system 102 can be configured to communicate with the storage system 104 via a bus. The bus can include, for example, PCI, PCI-Express, PCI-X, InfiniBand, HyperTransport, SCSI PCI-E card, SATA PCI-E card, iSCSI adaptor card, and Fibre Channel PCI-E card. In other embodiments, the host system 102 can be physically separated from the storage system 104. In such embodiments, the host system 102 can communicate with the storage system 104 via a communication network. The network can include the Internet, a local area network (LAN), a packet data network, a legacy network, or any type of network that is capable of providing data communication between the host system 102 and the storage system 104.

In some embodiments, the memory controller 106 can be implemented in hardware. The hardware can include logic circuits and/or memory for selecting target memory blocks and for evicting data from the selected target memory blocks to accommodate new data. In some embodiments, the hardware for the memory controller 106 can be implemented using a hardware description language including Verilog, VHSIC hardware description language (VHDL), and BlueSpec™ (Bluespec Inc., Framingham, Mass.), and be synthesized using logic synthesis tools including Design Compiler® (Synopsis Inc., Mountain View, Calif.), Encounter RTL compiler (Cadence Design Systems Inc., San Jose, Calif.), RealTime Designer (Oasys Design Systems, Inc., Santa Clara, Calif.), and BooleDozer (International Business Machine, Endicott, N.Y.).

In some embodiments, a memory controller 106 can be implemented as a part of firmware. The firmware can allocate a memory space for maintaining a wear count table and a wear count map, and can further include instructions operable to identify a memory block for a garbage collection operation.

In some embodiments, the memory controller 106 can be implemented in software using memory such as a non-transitory computer readable medium, a programmable read only memory (PROM), or flash memory. The software can run on a processor, which may reside in the memory controller 106. The processor can be configured to execute instructions or computer code, which can be embodied in a non-transitory computer readable medium embodied in the memory controller 106.

In some embodiments, each storage processing unit 108 can include a non-volatile memory (NVM) storage unit 110 for maintaining data and an accelerator 112 for computations.

In some embodiments, a NVM storage unit 110 can include a plurality of memory blocks for maintaining data. Each of the memory blocks can have a fixed size. For example, a memory block can be 128 KB long. Each memory block can be divided into a plurality of pages. Each page in the memory block can have a fixed size. For example, a page can be 4 KB long.

In some embodiments, the accelerator 112 can be configured to perform specialized operations, such as scientific computations. For example, the accelerator 112 can be configured to perform a Fast Fourier Transform, a key value store, search and sort, and/or matrix computations.

In some embodiments, the accelerator 112 can be implemented in hardware. The hardware for the accelerator 112 can be implemented using a hardware description language including Verilog, VHSIC hardware description language (VHDL), and BlueSpec™ (Bluespec Inc., Framingham, Mass.), and be synthesized using logic synthesis tools including Design Compiler® (Synopsis Inc., Mountain View, Calif.), Encounter RTL compiler (Cadence Design Systems Inc., San Jose, Calif.), RealTime Designer (Oasys Design Systems, Inc., Santa Clara, Calif.), and BooleDozer (International Business Machine, Endicott, N.Y.).

In some embodiments, the interconnection network 114 can be configured to provide communication between the plurality of storage processing units 108. The interconnection network 114 can be implemented in hardware to send and receive data. The interconnection network 114 can be configured to provide communication in one or more of a variety of media, such as an optical medium, an electrical medium, a magnetic medium, and/or any other types of medium that enables communication between the plurality of storage processing units 108. The interconnection network 114 can be configured to provide communication in a number of communication protocols. In some embodiments, the interconnection network 114 can include a PCI interface, a PCIe interface, a Serial AT Attachment (SATA) interface, and/or a Serial Attached SCSI (SAS) interface.

Figure 2:
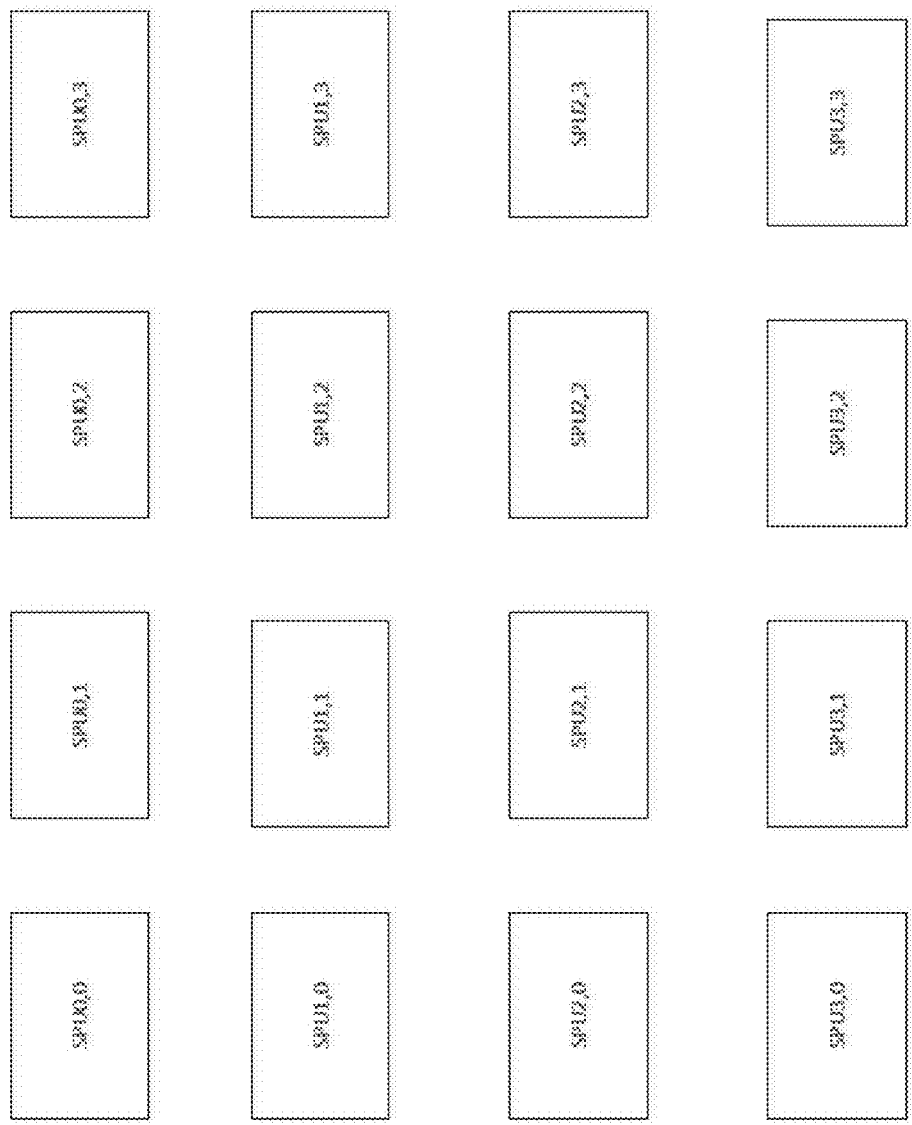
FIG. 2 shows a two-dimensional arrangement of the plurality of storage processing units in accordance with some embodiments.

In some embodiments, the plurality of storage processing units 108 can be arranged as a two-dimensional array. FIG. 2 shows a two-dimensional arrangement of the plurality of storage processing units in accordance with some embodiments. The plurality of storage processing units is arranged as a two-dimensional array, also referred to as a matrix arrangement. In this illustration, there are sixteen storage processing units. Therefore, the storage processing units can be arranged as a 4×4 matrix. In some embodiments, the storage processing units can be arranged on a circuit board, such as a printed circuit board (PCB), and the interconnection network 114 can include electrical conductors on the circuit board.

In some embodiments, one or more of the storage processing units 108 can be referenced using a two-dimensional index. For example, the top-left storage processing unit can be referred to as $SPU_{0,0}$, the bottom-right storage processing unit can be referred to as $SPU_{3,3}$, and the storage processing unit in the $i^{th}$ row and the $j^{th}$ column can be referred to as $SPU_{i,j}$.

In some embodiments, one of the plurality of storage processing units 108, also referred to as a source storage processing unit, can send data to a destination storage processing unit via the interconnection network 114. When the interconnection network 114 couples the source storage processing unit directly to the destination storage processing unit, the source storage processing unit can send data directly to the destination storage processing unit via the interconnection network 114. When the interconnection network 114 does not couple the source storage processing unit directly to the destination storage processing unit, the source storage processing unit can send data to the destination storage processing unit using various data routing techniques. For example, the source storage processing unit can send data to the destination storage processing unit using a minimum distance in the interconnection network 114. In some embodiments, the memory controller 106 can centrally schedule the routing of data in the interconnection network 114. In other embodiments, the plurality of storage processing units can schedule the routing of data in the interconnection network 114 in a distributed manner.

In some embodiments, the interconnection network 114 can include a plurality of unit network modules. Each unit network module can be configured to connect a subset of storage processing units in the two-dimensional array. For example, a unit network module can be configured to couple a subset of storage processing units (e.g., $SPU_{0,0}$, $SPU_{0,1}$, $SPU_{1,0}$, $SPU_{1,1}$) that are arranged as a two-dimensional array. The subset of storage processing units that are arranged as a two-dimensional array can also be referred to as a sub-array of storage processing units.

In some embodiments, a unit network module can include interface connections arranged in one of a plurality of connection topologies. The connection topology associated with the unit network module can determine the type of the unit network module. The plurality of connection topologies can include, for example, a ring topology, a modified ring topology, a full mesh topology, an L diagonal topology type 1, an L diagonal topology type 2, an L diagonal topology type 3, and an L diagonal topology type 4. These topologies are illustrated in FIGS. 3, 4, 6, and 7 in accordance with some embodiments. Each In some embodiments, a sub-array of storage processing units can be hierarchically connected to other sub-arrays of storage processing units. For example, in FIG. 2, the 16 storage processing units can be grouped into four sub-arrays of storage processing units. The first sub-array includes $SPU_{0,0}$, $SPU_{0,1}$, $SPU_{1,0}$, $SPU_{1,1}$; the second sub-array includes $SPU_{0,2}$, $SPU_{0,3}$, $SPU_{1,2}$, $SPU_{1,2}$; the third sub-array includes $SPU_{2,0}$, $SPU_{2,1}$, $SPU_{3,0}$, $SPU_{3,1}$; and the fourth sub-array includes $SPU_{2,2}$, $SPU_{2,3}$, $SPU_{3,2}$, $SPU_{3,3}$. These sub-arrays of storage processing units can be coupled to one another using one of the interconnection topologies described above, thereby providing hierarchical connections between storage processing units. In some embodiments, each sub-array of storage processing units can use the same type of unit network module. In other embodiments, at least one sub-array of storage processing units uses a different type of unit network module.

Figure 3:
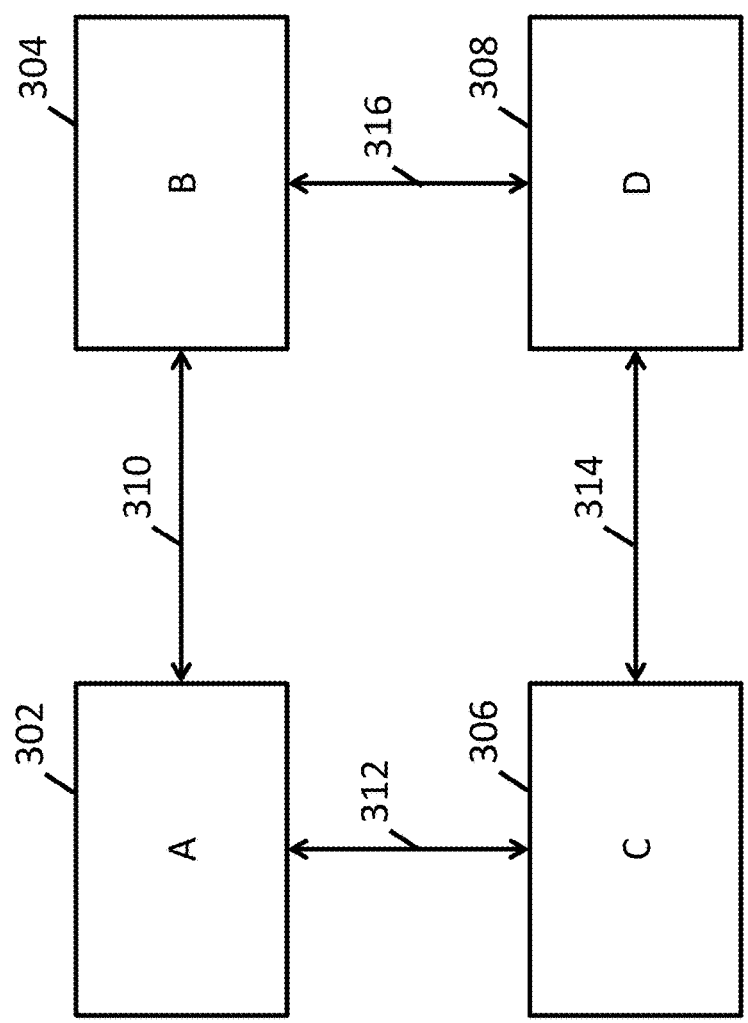
FIG. 3 illustrates a ring topology of a unit network module in accordance with some embodiments.

FIG. 3 illustrates a ring topology of a unit network module in accordance with some embodiments. FIG. 3 shows four storage processing units 302-308 arranged as a two-dimensional array. The unit network module includes four edges 310-316. The unit network module depicted in FIG. 3 is said to have a ring topology because the unit network module connects the storage processing units in a ring. Each edge of the unit network module indicates that there is a direct connection between two storage processing units (SPUs) connected by the edge. For example, the SPUA 302 and the SPUB 304 are directly connected to one another via the interconnection edge 310. When two SPUs are directly connected, the two SPUs can directly send data to one another via the interconnection edge that connects the two SPUs. For example, the SPUA 302 and the SPUB 304 can directly send data to one another via the interconnection edge 310. When two SPUs are not directly connected, the two SPUs can send data to one another via another SPU. For example, the SPUA 302 can send data to the SPUD 308 via either the SPUC 306 or the SPUB 304.

Figure 4:
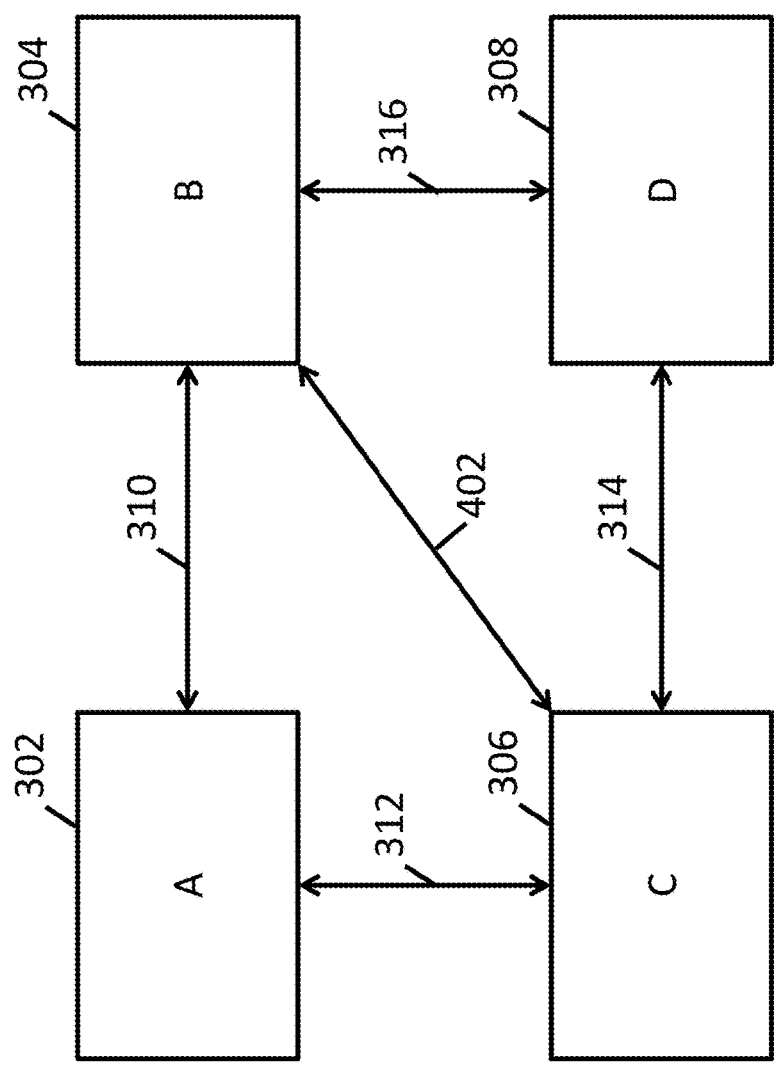
FIG. 4 illustrates a modified ring topology of a unit network module in accordance with some embodiments.

FIG. 4 illustrates a modified ring topology of a unit network module in accordance with some embodiments. The modified ring topology is similar to the ring topology illustrated in FIG. 3, but the modified ring topology has an additional diagonal edge 402.

Figure 5A:
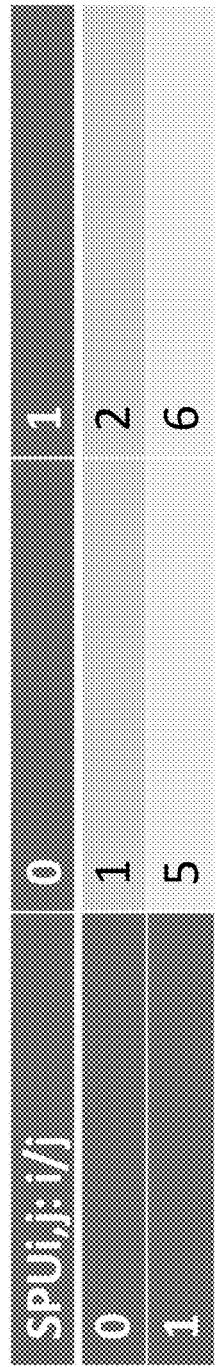
FIGS. 5A-5B illustrate the benefit of the additional edge in a matrix transpose operation in accordance with some embodiments.
Figure 5B:
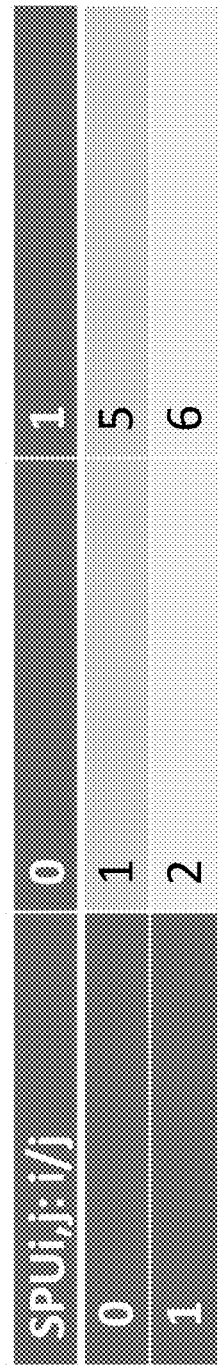

This additional edge 402 can facilitate data communication between the SPUB 304 and the SPUC 306, which may be beneficial for certain type of scientific computations. For example, the additional edge 402 can be beneficial for a matrix transpose operation. FIGS. 5A-5B illustrate the benefit of the additional edge 402 in a matrix transpose operation in accordance with some embodiments. FIG. 5A shows a two-by-two matrix $$P = \begin{bmatrix} 1 & 2 \\ 5 & 6 \end{bmatrix},$$

and FIG. 5B shows the transpose of this matrix $$P^T = \begin{bmatrix} 1 & 5 \\ 2 & 6 \end{bmatrix}.$$

When values of the matrix P are stored in separate SPUs (e.g., 1 is stored in $SPU_{0,0}$, 2 is stored in $SPU_{0,1}$, 5 is stored in $SPU_{1,0}$, and 6 is stored in $SPU_{1,1}$), the transpose operation has to rearrange the location of the values 2 and 5 by swapping values stored in $SPU_{0,1}$ and $SPU_{1,0}$. In this case, when $SPU_{0,0}$, $SPU_{0,1}$, $SPU_{1,0}$, $SPU_{1,1}$ are interconnected using an unit network module that has a modified ring topology, $SPU_{0,1}$ and $SPU_{1,0}$ can swap the values by directly sending data to one another via the edge 402. This illustrates that the unit network module having a modified ring topology can be useful for a matrix transpose operation.

Figure 6:
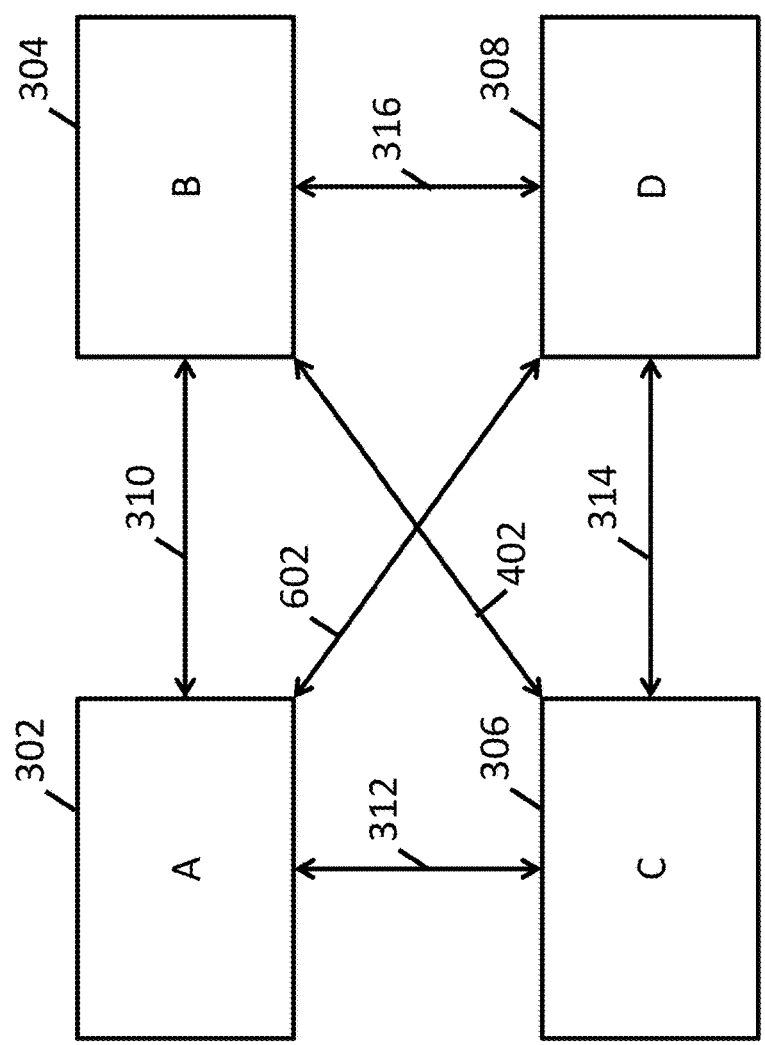
FIG. 6 illustrates a full-mesh topology of a unit network module in accordance with some embodiments.

FIG. 6 illustrates a full-mesh topology of a unit network module in accordance with some embodiments. The full-mesh topology is highly similar to the modified ring topology illustrated in FIG. 4, but the full-mesh topology has an additional diagonal edge 602. This additional edge 602 can facilitate data communication between the SPUA 302 and the SPUD 308, which may be beneficial for certain type of scientific operations. The additional edge 602 can incur additional real estate on the circuit board, but it may improve the processing power and the applicability of the SPU array because the SPU array has the additional flexibility to quickly transfer data between the SPU A 302 and the SPU D 308. A unit network module having a full-mesh topology can be particularly useful for Fast Fourier Transform (FFT), a Key value store, search and sort, and/or matrix computations.

Figure 7A:
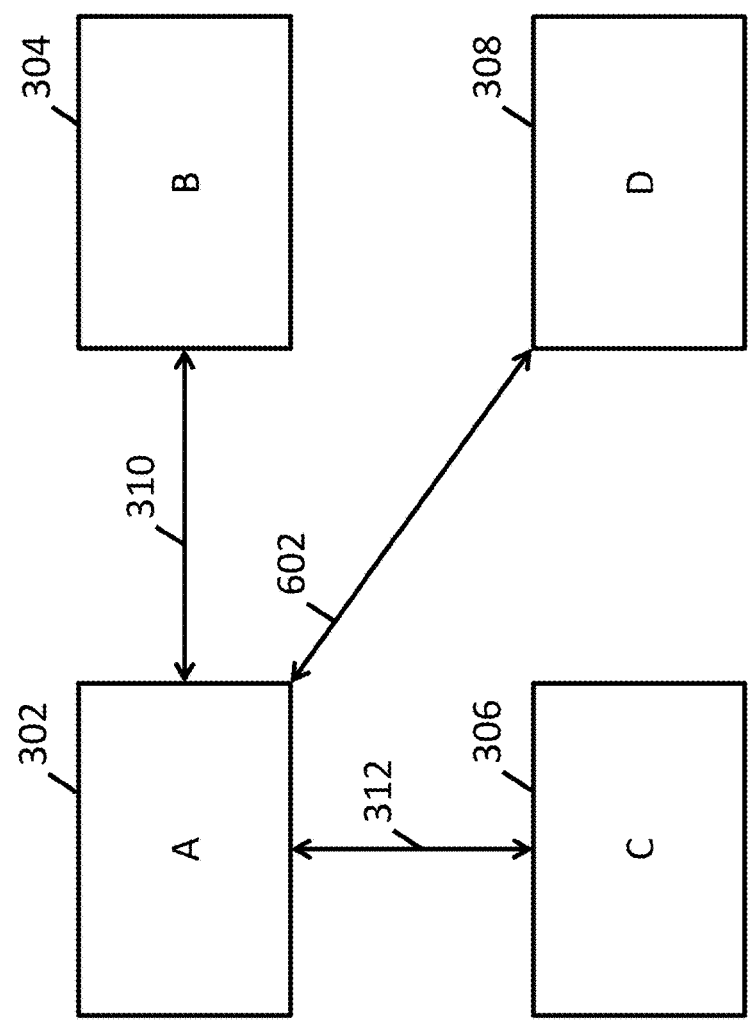
FIGS. 7A-7D show four L diagonal topologies of a unit network module in accordance with some embodiments.
Figure 7B:
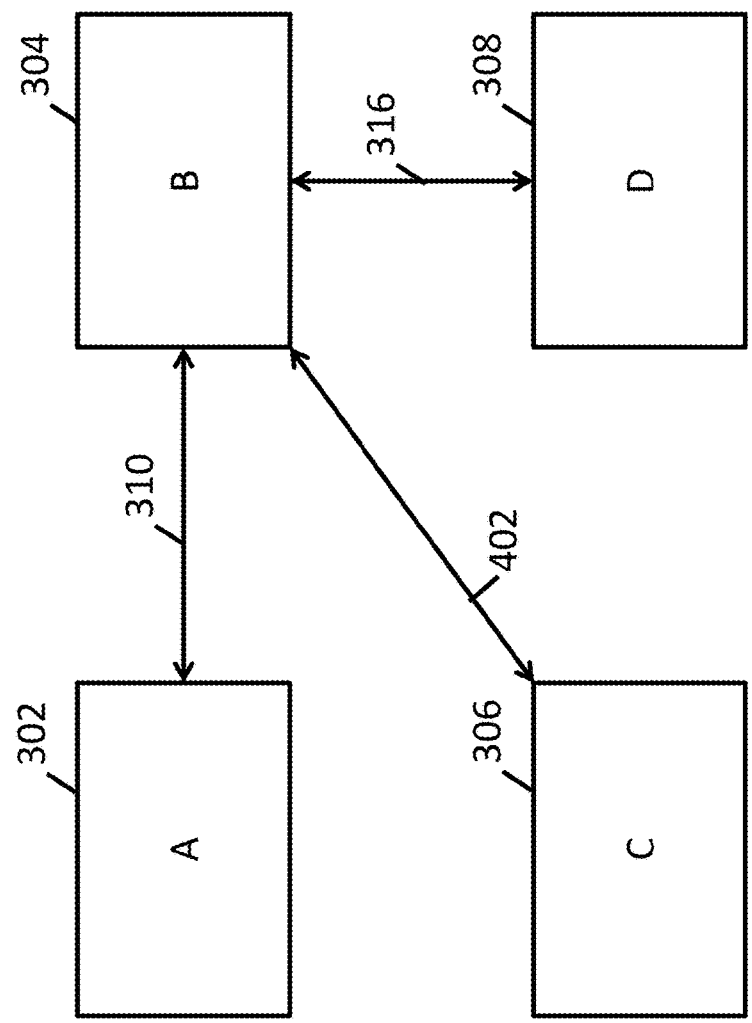
Figure 7C:
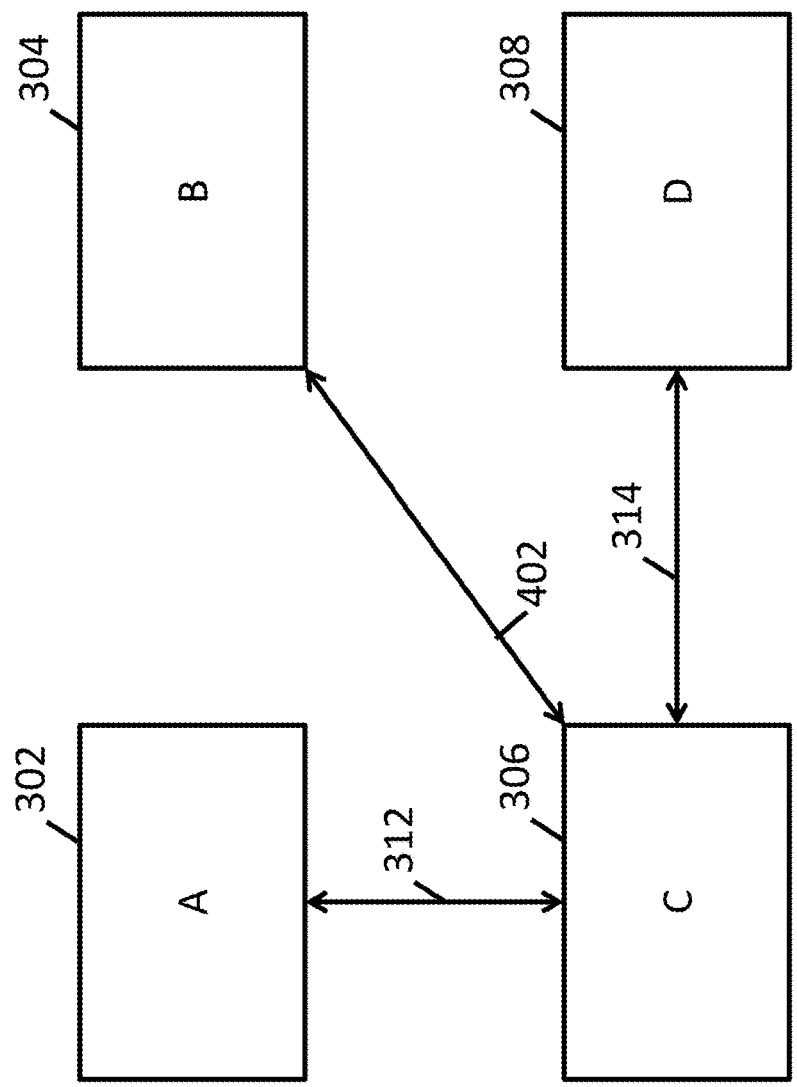
Figure 7D:
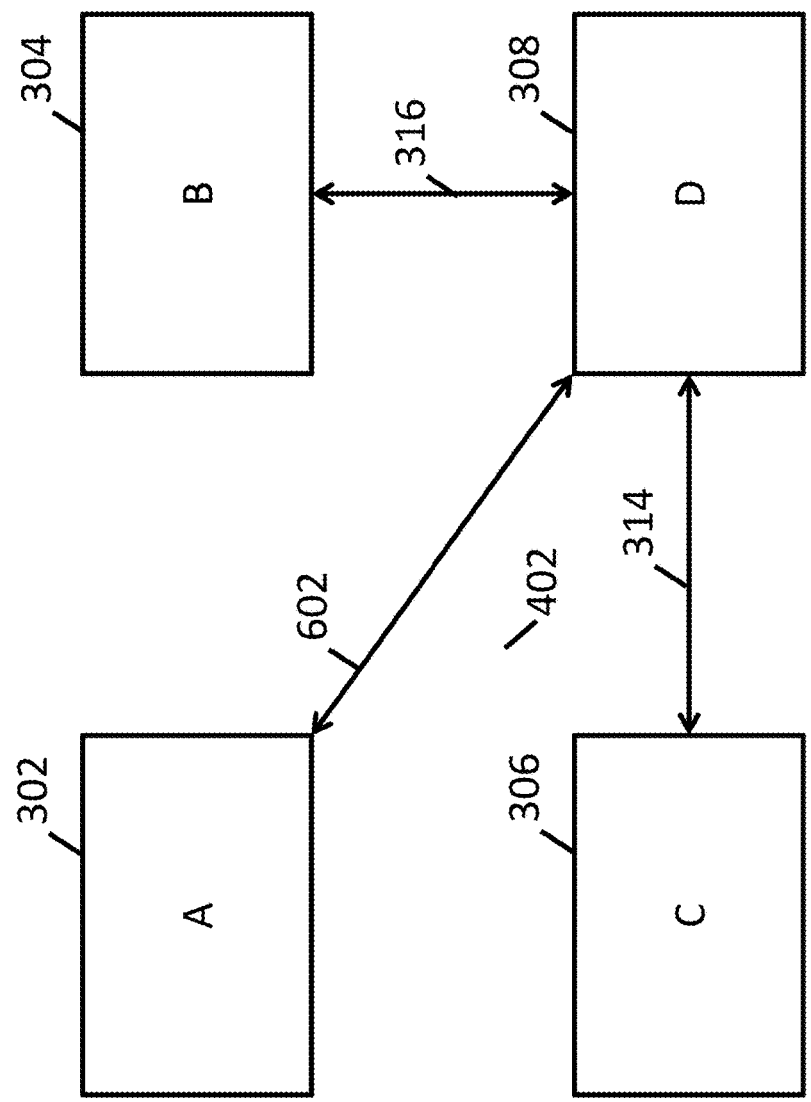

Depending on particular applications of interest, different topologies of a unit network module can be useful as well. FIGS. 7A-7D show four L diagonal topologies of a unit network module in accordance with some embodiments. The topology illustrated in FIG. 7A is referred to as a L diagonal topology type 1; the topology illustrated in FIG. 7B is referred to as a L diagonal topology type 2; the topology illustrated in FIG. 7C is referred to as a L diagonal topology type 3; and the topology illustrated in FIG. 7D is referred to as a L diagonal topology type 4.

The L diagonal topology, in general, includes a diagonal edge, and two edges around the rim to form an L-shape. For example, the L diagonal topology type 1, shown in FIG. 7A, includes a reverse diagonal edge 602 and two edges 310, 312 coupled to the SPUA 302. This way, the SPUA 302 can serve as a communication hub amongst the four SPUs. As another example, the L diagonal topology type 2, shown in FIG. 7B, includes a diagonal edge 402 and two edges 310, 316 coupled to the SPUB 304. This way, the SPUB 304 can serve as a communication hub amongst the four SPUs. As another example, the L diagonal topology type 3, shown in FIG. 7C, includes a diagonal edge 402 and two edges 312, 314 coupled to the SPUC 306. This way, the SPUC 306 can serve as a communication hub amongst the four SPUs. As another example, the L diagonal topology type 4, shown in FIG. 7D, includes a reverse diagonal edge 602 and two edges 314, 316 coupled to the SPUD 308. This way, the SPUD 308 can serve as a communication hub amongst the four storage processing units.

When the memory system has a large number of storage processing units, connecting the storage processing units using topologies described above can be complex and expensive. Furthermore, some of the topologies described above do not readily extend to larger two-dimensional arrays of storage processing units. For example, the ring topology does not readily extend to a 4×4 array of storage processing units because four storage processing units at the center of the 4×4 array of storage processing units would lack interconnects to other storage processing units.

This issue can be addressed by connecting storage processing units using a unit network module in a hierarchical manner.

Figure 8:
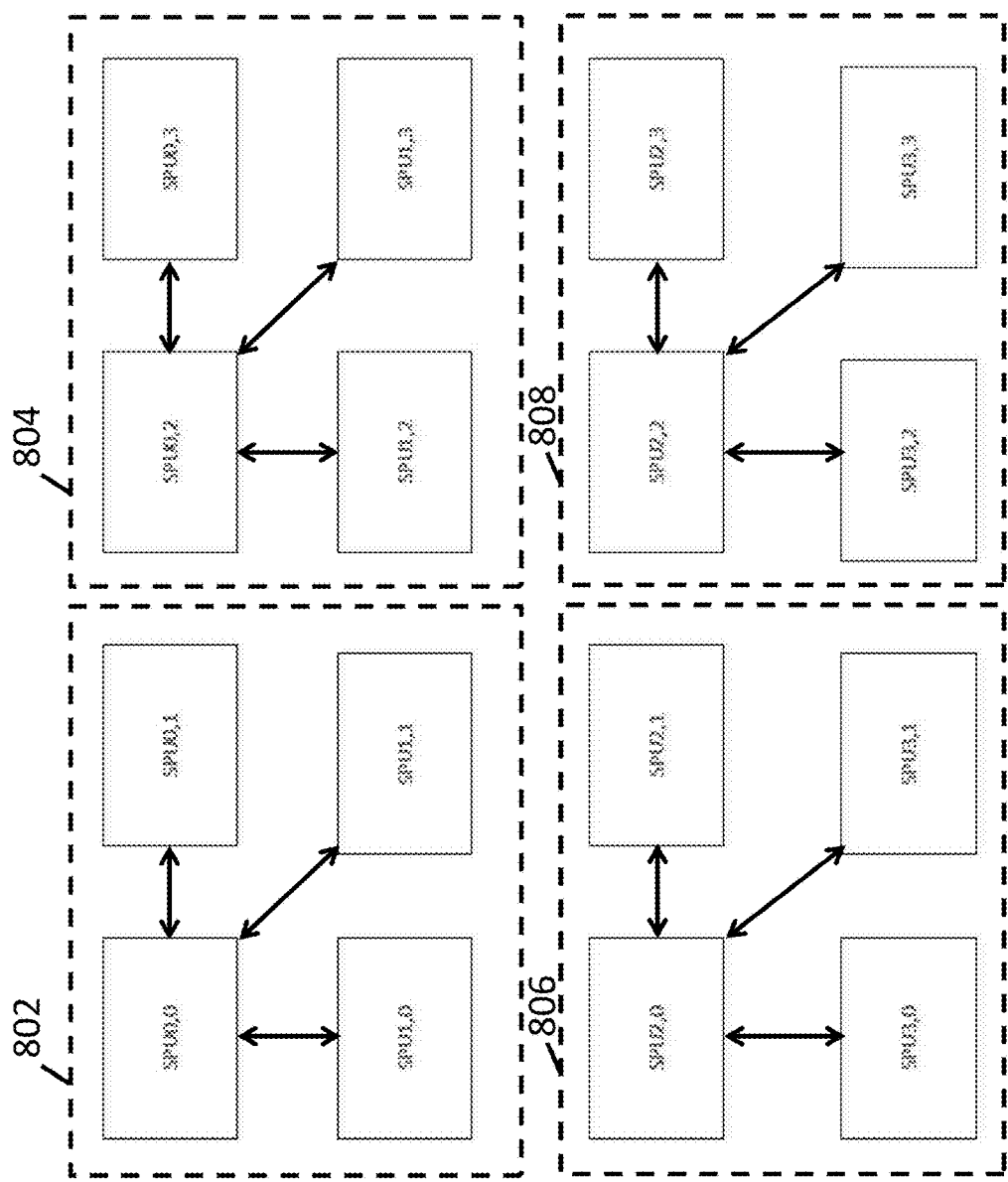
FIG. 8 illustrates a plurality of sub-arrays of storage processing units in accordance with some embodiments.

In some embodiments, a two-dimensional array of storage processing units can be broken into a plurality of sub-arrays of storage processing units, and the storage processing units in the same sub-array can be coupled to one another using a unit network module. FIG. 8 illustrates a plurality of sub-arrays of storage processing units in accordance with some embodiments. Each sub-array 802-808 is shown by the dotted enclosure—each sub-array 802-808 has four storage processing units. The storage processing units in the sub-array are coupled to one another using the L diagonal topology type 1 shown in FIG. 7A.

In some embodiments, each sub-array can use the same type of unit network module. For example, in FIG. 8, each sub-array uses the identical type of unit network module: the L diagonal topology type 1 shown in FIG. 7A.

Figure 9:
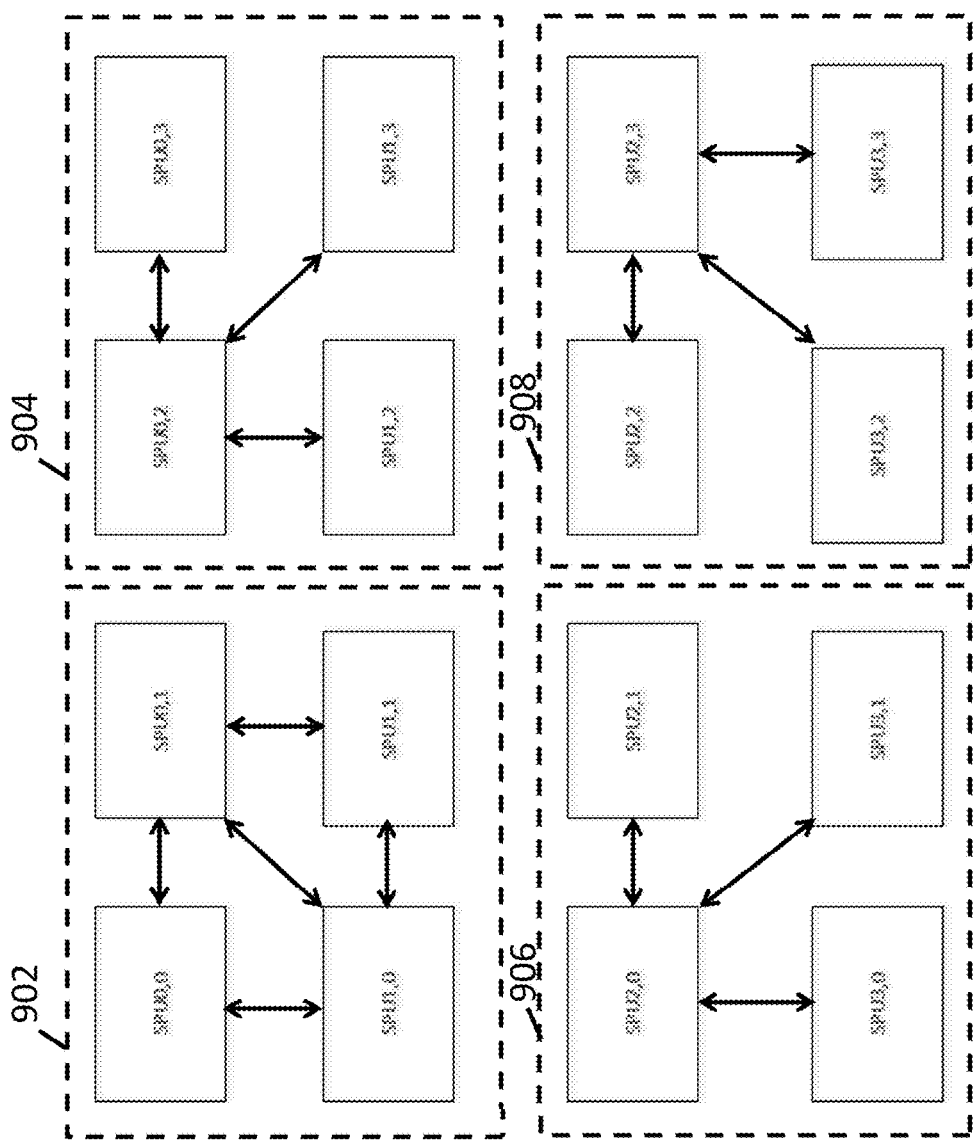
FIG. 9 illustrates a plurality of sub-arrays of storage processing units in accordance with some embodiments.

In other embodiments, one or more sub-arrays may use different types of unit network modules. FIG. 9 illustrates a plurality of sub-arrays of storage processing units in accordance with some embodiments. In FIG. 9, one or more of the sub-arrays 902-908 use different types of unit network modules. For instance, the top-left sub-array 902 uses a unit network module having a modified ring topology, and the bottom-right sub-array 908 uses a unit network module having a L diagonal topology type 2. This way, when a first one of the sub-arrays is used for a first application (e.g., FFT computation) and a second one of the sub-arrays is used for a second application (e.g., matrix transpose operation), then the unit network module for the first one and the second one can be independently configured to improve the performance for respective applications.

Figure 10:
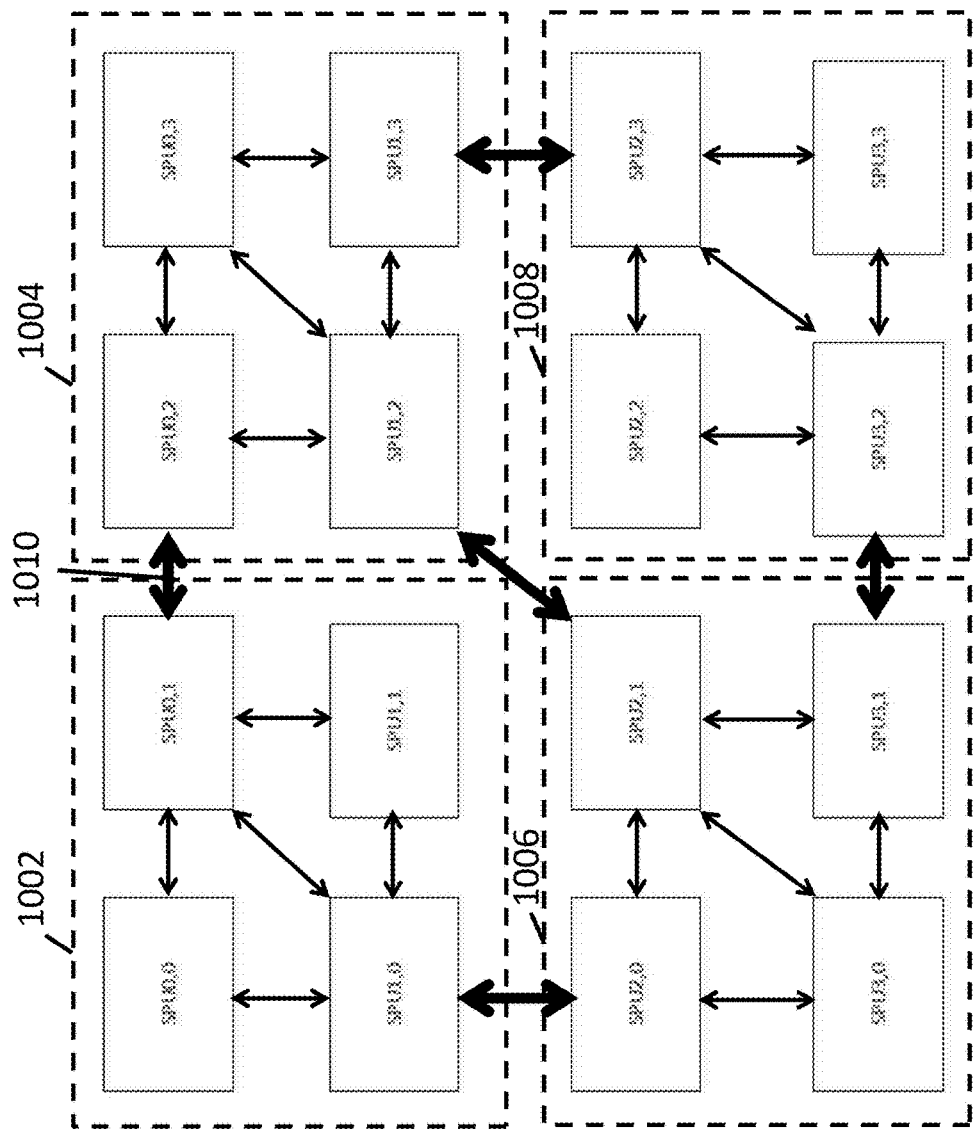
FIG. 10 shows a hierarchical modified ring network of storage processing units in accordance with some embodiments.

In some embodiments, the sub-arrays can be connected to one another using one or more of the topologies disclosed above, thereby forming a hierarchical interconnection network of storage processing units. FIG. 10 shows a hierarchical modified ring network of storage processing units in accordance with some embodiments. In FIG. 10, each sub-array 1002-1008 uses a unit network module having a modified ring topology. The sub-arrays 1002-1008 are, in turn, connected to one another using the same modified ring topology, as shown by the thick arrows connecting the dotted enclosures. This way, a hierarchical modified ring network of SPUs can be formed. This hierarchical modified ring network of storage processing units can be referred to as a hierarchical modified ring network (HMRN)-4 because there are four unit modified ring network interconnections that are hierarchically connected.

In some embodiments, the routing of interface across the sub-arrays of storage processing units can be determined based on the amount of buffer memory available in SPUs. For example, the interface 1010 provides direct communication between the first sub-array 1002 and the second sub-array 1004. FIG. 10 illustrates that the interface 1010 is connected to SPU0,1 of the first sub-array 1002 and SPU0,2 of the second sub-array 1004. However, in some embodiments, the interface 1010 may be connected to SPU1,1 of the first sub-array 1002 and/or SPU1,2 of the second sub-array 1002, depending on the amount of buffer memory available in SPU0,1, SPU0,2, SPU1,1, and SPU1,2. For instance, when SPU1,1 has more buffer memory available compared to SPU0,1, the interface 1010 can be connected to SPU1,1. Similarly, when when SPU1,2 has more buffer memory available compared to SPU0,2, the interface 1010 can be connected to SPU1,2. Therefore, there are four different ways to provide the interface 1010 between the first sub-array 1002 and the second sub-array 1004. This applies similarly to the interfaces between the second sub-array 1004 and the third sub-array 1006; the third sub-array 1006 and the fourth sub-array 1008; and the fourth sub-array 1008 and the first sub-array 1002.

In some cases, the hierarchical interconnection network can be formed recursively. For example, four HMRN-4 can be used to construct HMRN-16 in which the four HMRN-4 are connected using a unit modified ring network interconnection. Similarly, four HMRN-16 can be used to construct HMRN-64 in which four HMRN-16 connected using a unit modified ring network interconnection. As a generalization, four HMRN-N/4 be used to construct HMRN-N in which the four HMRN-N/4 are connected using a unit modified ring network interconnection.

Figure 11:
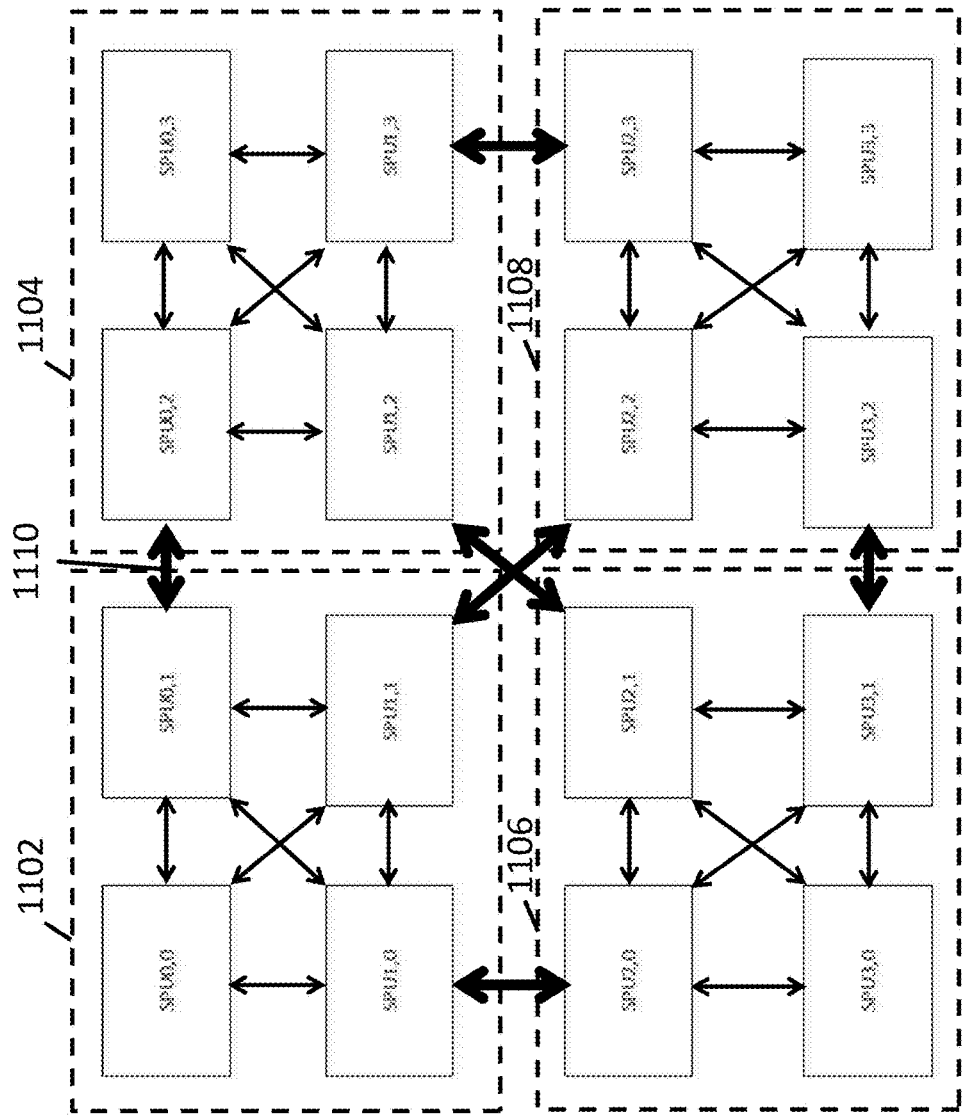
FIG. 11 shows a hierarchical mesh network of storage processing units in accordance with some embodiments.

FIG. 11 shows a hierarchical mesh network of storage processing units in accordance with some embodiments. In FIG. 11, each sub-array 1102-1108 uses a unit network module having a full-mesh topology. The sub-arrays 1102-1108 are, in turn, connected to one another using the same full-mesh topology, as shown by the thick arrows connecting the dotted enclosures. This way, a hierarchical full-mesh network of storage processing units can be formed. The full-mesh network shown in FIG. 11 can be referred to as the hierarchical full-mesh network (HFMN)-4.

In some embodiments, the routing of interface across the sub-arrays of storage processing units can be determined based on the amount of buffer memory available in SPUs. For example, the interface 1110 provides direct communication between the first sub-array 1102 and the second sub-array 1104. FIG. 11 illustrates that the interface 1110 is connected to SPU0,1 of the first sub-array 1102 and SPU0,2 of the second sub-array 1104. However, in some embodiments, the interface 1110 may be connected to SPU1,1 of the first sub-array 1102 and/or SPU1,2 of the second sub-array 1102, depending on the amount of buffer memory available in SPU0,1, SPU0,2, SPU1,1, and SPU1,2. For instance, when SPU1,1 has more buffer memory available compared to SPU0,1, the interface 1110 can be connected to SPU1,1. Similarly, when when SPU1,2 has more buffer memory available compared to SPU0,2, the interface 1110 can be connected to SPU1,2. Therefore, there are four different ways to provide the interface 1110 between the first sub-array 1102 and the second sub-array 1104. This applies similarly to the interfaces between the second sub-array 1104 and the third sub-array 1106; the third sub-array 1106 and the fourth sub-array 1108; and the fourth sub-array 1108 and the first sub-array 1102.

In some cases, the hierarchical full-mesh network can be formed recursively. For example, four HFMN-4 can be used to construct HFMN-16 in which the four HFMN-4 are connected using a unit full-mesh network interconnection. Similarly, four HFMN-16 can be used to construct HFMN-64 in which four HFMN-16 connected using a unit full-mesh network interconnection. As a generalization, four HFMN-N/4 be used to construct HFMN-N in which the four HFMN-N/4 are connected using a unit full-mesh network interconnection.

In some embodiments, the hierarchical interconnection network of storage processing units can use two or more types of unit network modules. When a first sub-array of storage processing units is connected to a second sub-array of storage processing units via an interface, the interface can connect the communication hub of the first sub-array and the communication hub of the second sub-array. For example, when the first sub-array includes a L-diagonal type 1 unit network module (as shown in FIG. 7A) and the first sub-array includes a L-diagonal type 2 unit network module (as shown in FIG. 7B), then the interface that connects the first sub-array and the second sub-array can connect SPUA 302 of the first sub-array and the SPUB 304 of the second sub-array.

In some embodiments, the types of unit network modules used in the hierarchical interconnection network can depend on the particular application. For example, consider a matrix block-transpose operation. Suppose that a matrix X includes block matrices, A, B, C, and D as follows:

$$X = \begin{bmatrix} A & B \\ C & D \end{bmatrix}.$$

Then the transpose of X, identified as $X^T$, can be computed as follows:

$$X^T = \begin{bmatrix} A & B \\ C & D \end{bmatrix}^T = \begin{bmatrix} A^T & C^T \\ B^T & D^T \end{bmatrix}.$$

This shows that $A^T$ and $D^T$ remain in the same position, but $B^T$ and $C^T$ have swapped positions.

Figure 12:
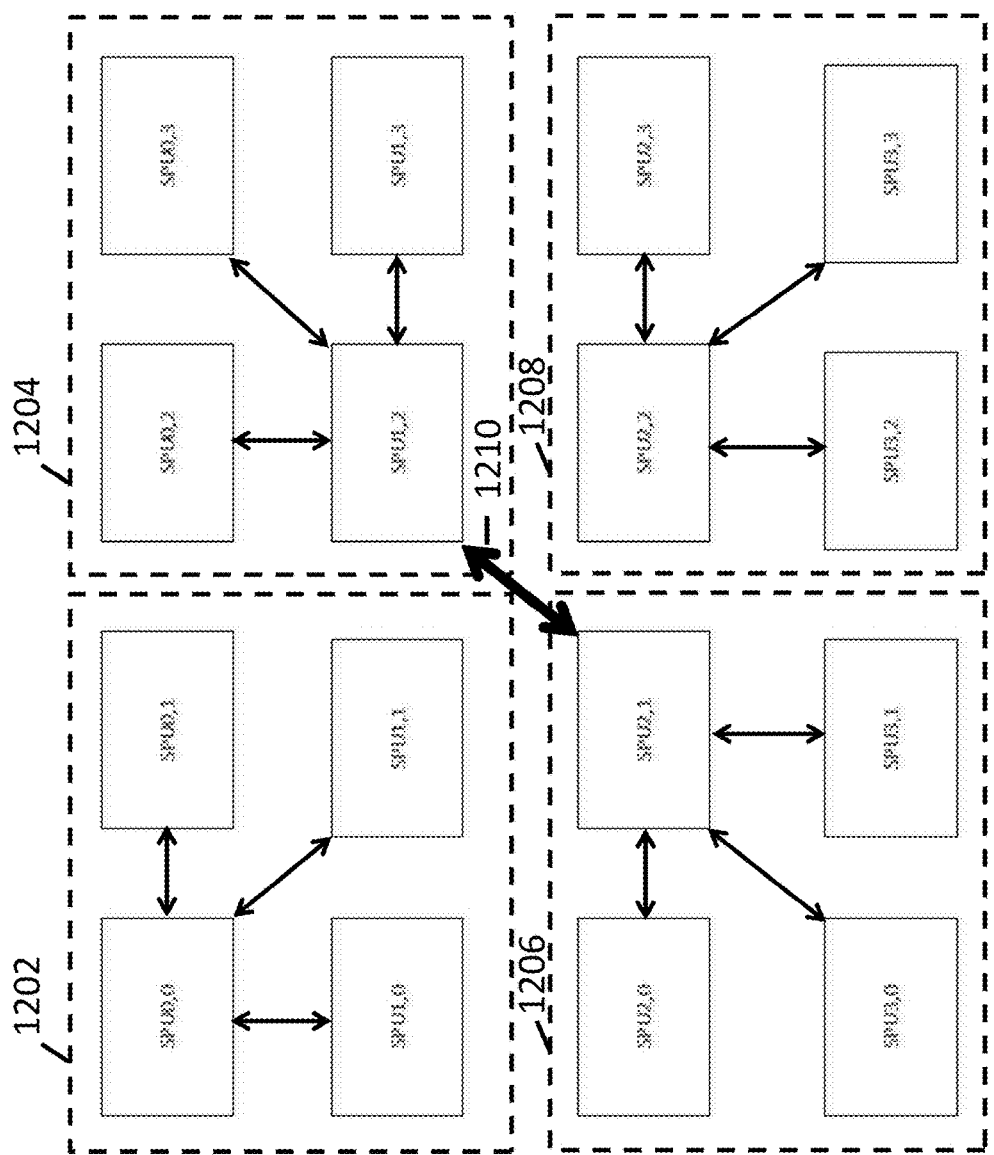
FIG. 12 shows a hierarchical network of storage processing units in accordance with some embodiments.

This feature of a matrix block-transpose operation can be leveraged by the array of storage processing units. FIG. 12 shows a hierarchical network of storage processing units in accordance with some embodiments. The network in FIG. 12 uses three types of unit network module: the L-diagonal topology type 1, the L-diagonal topology type 2, and L-diagonal topology type 3, and only two of these unit network modules are connected using a single diagonal connection 1210, as shown by a thick arrow.

Figure 13:
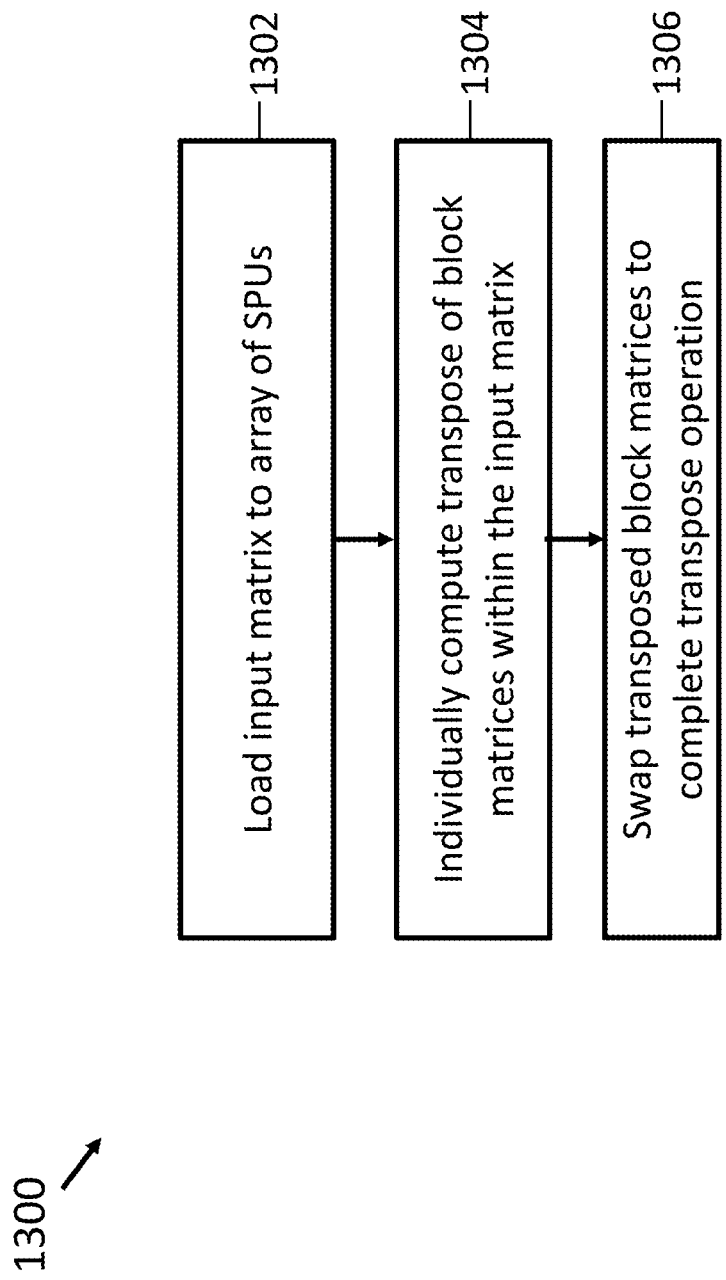
FIG. 13 illustrates a block transpose operation using the array of storage processing units in accordance with some embodiments.

In some embodiments, the array of storage processing units shown in FIG. 12 can be useful for performing a matrix block-transpose operation for matrices having a size greater than 4×4. FIG. 13 illustrates a block transpose operation 1300 using the array of storage processing units in accordance with some embodiments.

Figures 14A, 14B, 14C:
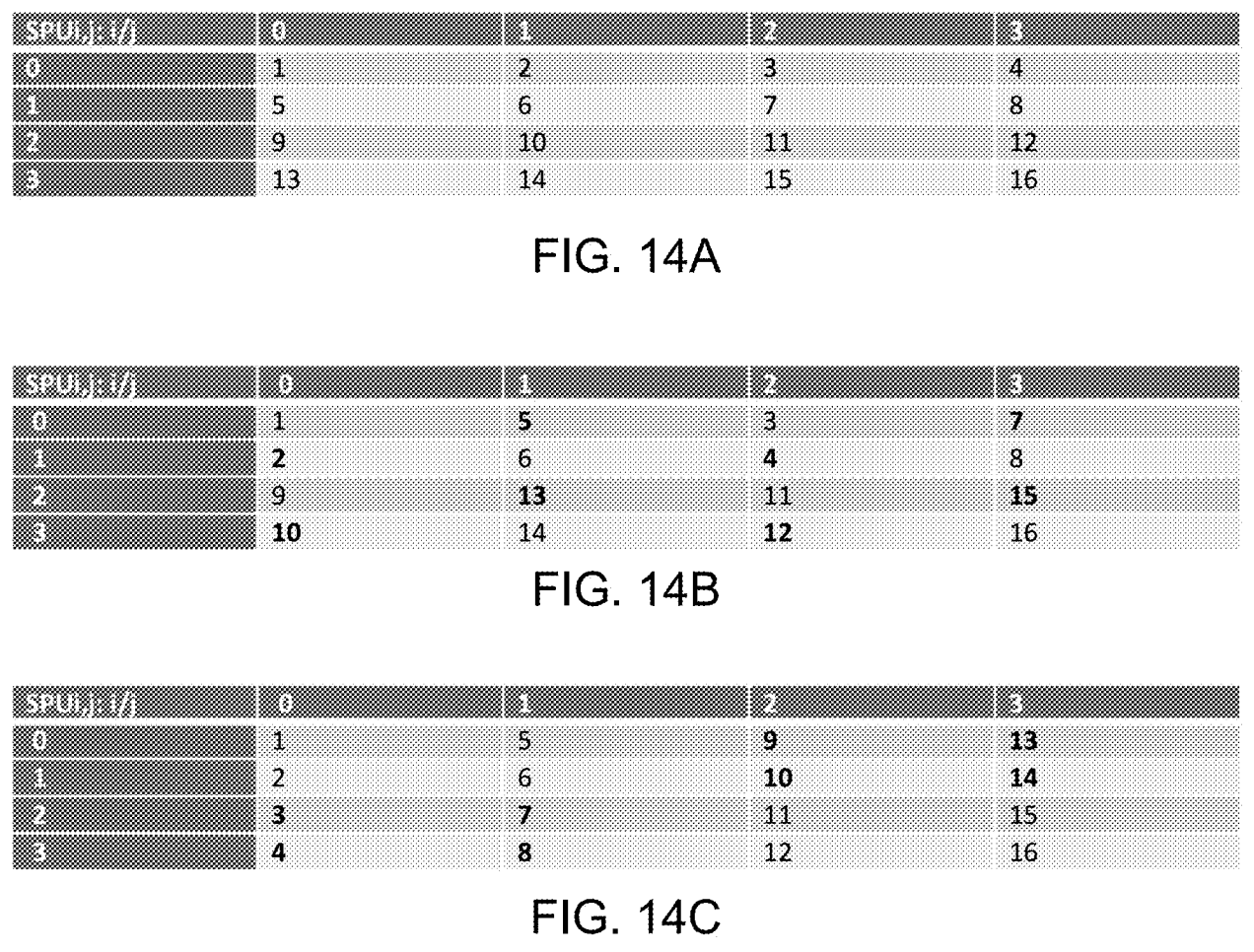

In step 1302, the memory controller 106 can load the storage processing units with the input matrix X. Suppose that the input matrix X is 4×4, which is divided into four 2×2 matrices. Each 2×2 matrix is loaded onto one of the sub-arrays 1202, 1204, 1206, 1208. The 2×2 matrix corresponding to the sub-array 1202 can be referred to as A; the 2×2 matrix corresponding to the sub-array 1204 can be referred to as B; the 2×2 matrix corresponding to the sub-array 1206 can be referred to as C; and the 2×2 matrix corresponding to the sub-array 1208 can be referred to as D. An example of the input matrix X and the configuration in which the input matrix X is loaded onto the array of storage processing units is shown in FIG. 14A.

In step 1304, each of the sub-arrays can locally perform a transpose operation using the unit network module and/or the accelerator in the respective storage processing units. After this local block-wise transpose operation, the 2×2 matrix corresponding to the sub-array 1202 can maintain $A^T$; the 2×2 matrix corresponding to the sub-array 1204 can maintain $B^T$; the 2×2 matrix corresponding to the sub-array 1206 can maintain $C^T$; and the 2×2 matrix corresponding to the sub-array 1204 can maintain $D^T$. The outcome of the local block-wise transpose operation is shown in FIG. 14B. The bolded numbers in FIG. 14B indicate the elements of the matrix X whose locations have been swapped through the local block-wise transpose operation.

In step 1306, the sub-array 1204 and the sub-array 1206 can swap the transposed block matrices $B^T$ and $C^T$ to complete the matrix transpose operation. Because $SPU_{1,2}$ and $SPU_{2,1}$ form the hub of the sub-array 1204 and the sub-array 1206, respectively, the diagonal connection 1210 between the sub-array 1204 and the sub-array 1206 can efficiently transfer data between the sub-array 1204 and the sub-array 1206. After step 1306, the array of SPUs can maintain the transpose of the input matrix X:

$$X^T = \begin{bmatrix} A^T & C^T \\ B^T & D^T \end{bmatrix}.$$

The outcome of step 1306 on the data shown in FIG. 14B is shown in FIG. 14C. The bolded numbers in FIG. 14C indicate the elements of the matrix X whose locations have been swapped through step 1306.

In some embodiments, the operations illustrated in FIG. 13 can be performed iteratively to perform a transpose operation of a larger matrix, for example, 8×8 matrix, 16×16 matrix, and any matrix having the size of $2^N \times 2^N$, where N is an integer number.

Figure 15:
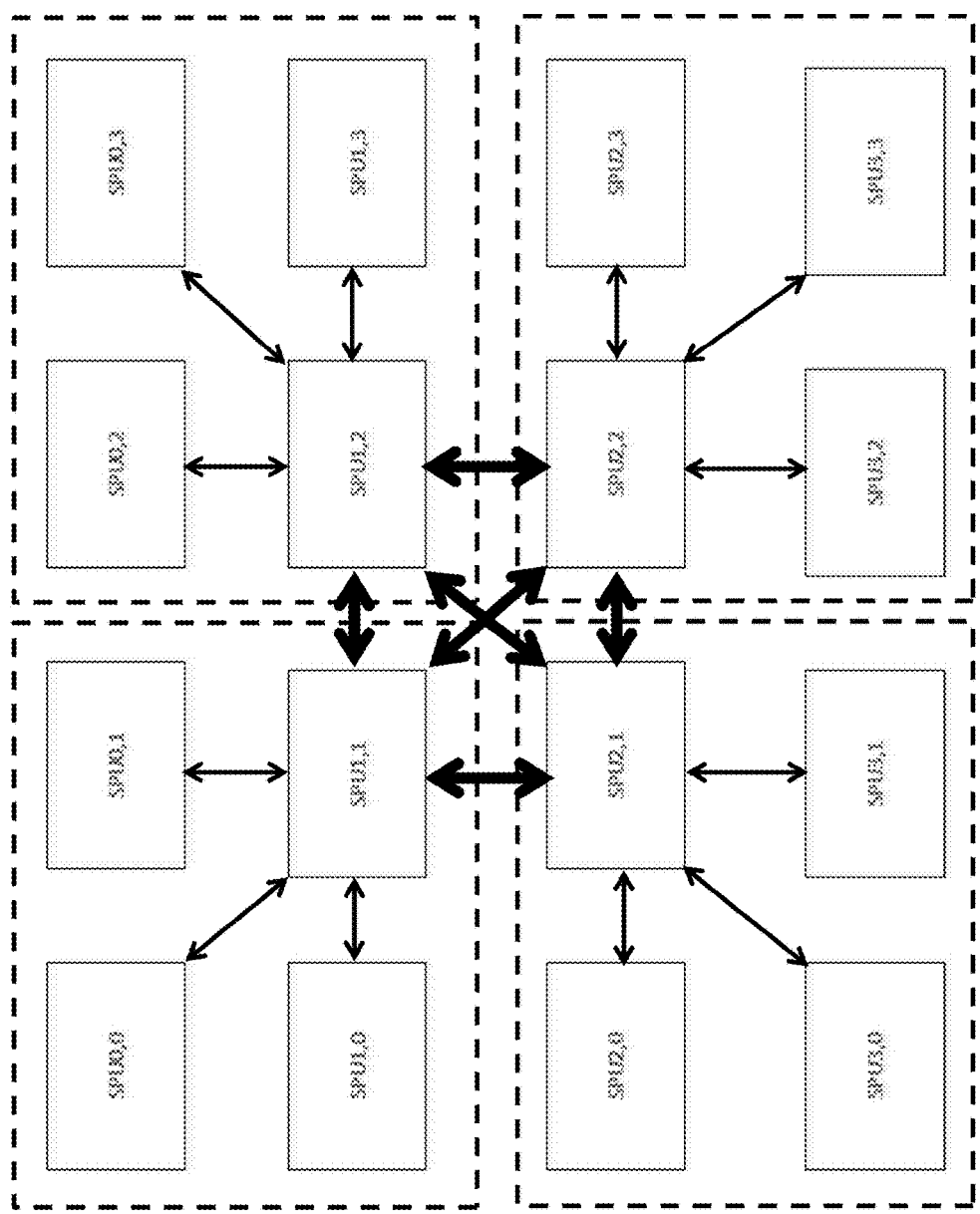
FIG. 15 shows a hierarchical network of storage processing units in accordance with some embodiments.

FIG. 15 shows a hierarchical network of storage processing units in accordance with some embodiments. The network in FIG. 15 uses three types of unit network module: the L-diagonal topology type 1, the L-diagonal topology type 2, and L-diagonal topology type 3, and these unit network modules are connected using a full-mesh topology, as shown by thick arrows. The array of storage processing units in FIG. 15 can also be used to perform a matrix block-transpose operation in accordance with the process illustrated in FIG. 13.

Where reference is made herein to a method comprising two or more defined steps, the defined steps can be carried out in any order or simultaneously (except where the context would indicate otherwise), and the method can include one or more other steps which are carried out before any of the defined steps, between two of the defined steps, or after all the defined steps (except where the context would indicate otherwise).

Those of skill in the art would appreciate that various illustrations described herein may be implemented as electronic hardware, computer software, firmware, or combinations of two or more of electronic hardware, computer software, and firmware. To illustrate this interchangeability of hardware, software, and/or firmware, various illustrative blocks, modules, elements, components, methods, and algorithms have been described above generally in terms of their functionality. Whether such functionality is implemented as hardware, software, firmware, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology. An implementation of the disclosed subject matter can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The disclosed subject matter can also be embedded in a computer program product, which comprises all the features enabling the implementation of the methods and systems described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A solid state device system comprising:
   a plurality of storage processing units arranged as a two-dimensional array, wherein each of the plurality of storage processing units comprises a computational unit and a non-volatile memory module; and
   an interconnection network comprising a plurality of unit network modules, wherein the interconnection network is configured to provide data communication between the plurality of storage processing units;
   wherein the plurality of storage processing units is grouped into a plurality of sub-arrays of storage processing units;
   wherein storage processing units in a first sub-array of the plurality of sub-arrays are coupled to one another using a first one of the plurality of unit network modules; and
   a memory controller configured to schedule data transfer between the plurality of storage processing units via the interconnection network.

2. The system of claim 1, wherein storage processing units in a second sub-array of the plurality of sub-arrays are coupled to one another using a second one of the plurality of unit network modules.

3. The system of claim 1, wherein the memory controller is further configured to:
   load a plurality of blocks corresponding to a two-dimensional matrix onto the plurality of sub-arrays;
   trigger the plurality of sub-arrays to locally perform a transpose operation to compute a transpose of the plurality of blocks; and
   trigger two of the sub-arrays to exchange the transpose of blocks stored in the two of the sub-arrays via the interconnection network.

4. The system of claim 1, wherein the computational unit in the plurality of storage processing units is configured to perform scientific computation.

5. The system of claim 1, wherein one of the plurality of unit network modules comprises a L-diagonal type 1 unit network module.

6. The system of claim 1, wherein one of the plurality of unit network modules comprises a L-diagonal type 2 unit network module.

7. The system of claim 1, wherein one of the plurality of unit network modules comprises a L-diagonal type 3 unit network module.

8. The system of claim 1, wherein one of the plurality of unit network modules comprises a L-diagonal type 4 unit network module.

9. The system of claim 1, wherein one of the plurality of unit network modules comprises a full-mesh unit network module.

10. A system comprising:
    the solid state device system of claim 1; and
    a host device in data communication with the solid state device system, wherein the host device is configured to send data to the solid state device system to be processed by the computational unit in the plurality of storage processing units.

11. The system of claim 2, wherein the plurality of sub-arrays, including the first sub-array and the second sub-array, are coupled to one another using a third one of the plurality of unit network modules, thereby forming a hierarchical interconnection of storage processing units.

12. The system of claim 3, wherein the memory controller is configured to determine a route on the interconnection network over which the two of the sub-arrays exchange the transpose of blocks.

13. The system of claim 11, wherein each of the unit network modules has a first type of interconnection topology.

14. The system of claim 11, wherein the first one of the plurality of unit network modules has a first type of interconnection topology and the second one of the plurality of unit network modules has a second type of interconnection topology.

15. The system of claim 11, wherein the first sub-array is disposed diagonally from the second sub-array, and the third one of the plurality of unit network modules comprises a diagonal interconnect that is configured to directly connect the first sub-array and the second sub-array.

16. The system of claim 13, wherein the first type of interconnection topology comprises a modified ring network topology.

17. The system of claim 14, wherein the first type of interconnection topology comprises a modified ring network topology.

18. The system of claim 15, wherein the diagonal interconnect is configured to directly connect a communication hub of the first sub-array and a communication hub of the second sub-array.

19. The system of claim 1, wherein the plurality of storage processing units is arranged on printed circuit board and the interconnection network comprises an electrical conductor on the printed circuit board.

* * * * *